United States Patent [19]
Mutti

[11] 4,266,598
[45] May 12, 1981

[54] METHOD AND APPARATUS FOR STORING HEAT ENERGY

[76] Inventor: Werner H. Mutti, Rigistrasse 16, CH-5033 Buchs, Switzerland

[21] Appl. No.: 48,101

[22] Filed: Jun. 13, 1979

[30] Foreign Application Priority Data

Jun. 14, 1978 [DE] Fed. Rep. of Germany ....... 2826058

[51] Int. Cl.³ .............................................. F28D 21/00
[52] U.S. Cl. ......................................... 165/1; 165/91; 165/104 S
[58] Field of Search ................... 165/104 S, 94, 89, 91

[56] References Cited

U.S. PATENT DOCUMENTS

| | | | |
|---|---|---|---|
| 2,599,346 | 6/1952 | Offen | 165/89 |
| 3,775,991 | 12/1973 | Field | 165/91 X |
| 3,997,001 | 12/1976 | Chubb | 165/94 |
| 4,064,931 | 12/1977 | Laing | 165/104 S X |
| 4,154,292 | 5/1979 | Herrick | 165/104 S X |

*Primary Examiner*—Albert W. Davis
*Attorney, Agent, or Firm*—Blanchard, Flynn, Thiel, Boutell & Tanis

[57] ABSTRACT

Method and apparatus for storing of heat by use of the heat of fusion or crystallization of a liquid-solid storage medium. A conventional crystallization roller rotates with its circumference partially immersed in the melted storage medium. Heat receiving liquid circulated through the drum to a point of use receives heat from melted storage medium in contact with the drum, whereby such storage medium solidifies on the surface of the drum. The drum rotates the solidified storage medium past a fixed scraper which transfers the solid storage medium to a heat exchanger. Heat supplying liquid circulating through the heat exchanger imparts its heat to, and melts, the scraped-off storage medium which returns to the storage medium reservoir and brings with it the heat obtained from the heat supplying liquid.

8 Claims, 2 Drawing Figures

METHOD AND APPARATUS FOR STORING HEAT ENERGY

FIELD OF THE INVENTION

The present invention relates to a method and apparatus for storing heat energy by the employ of a crystallization cylinder for utilizing heat energy available at inopportune times or at unsuitable temperature levels (e.g. solar energy).

BACKGROUND OF THE INVENTION

For physical reasons, a substance can assume three different states of aggregation, in which its specific heat may be different. The storage of heat with the specific heat of a substance is most suitably accomplished in the solid and liquid states of aggregation. This method has already found technical application for instance in storage radiators with a stone filling and in water storage boilers. From the viewpoint of thermodynamics it appears more expedient to employ for storage purposes the heat energy required for a change of the state of aggregation, since this amount of heat is in many cases a multiple of the specific heat amount, and the heat exchange takes place at a constant temperature level. Of particular technical interest is the storage of heat by way of crystallization or fusion heat. The heat can be readily exchanged with a storage medium in the liquid or solid state. An obstacle for the technical employ of the fusion heat storage on a major scale is the crystallization delay which may cause the onset of crystallization to shift several degrees Celsius due to the lack of suitable nuclei or starting points.

It is an object of the present invention to provide a method and apparatus as set forth in the introduction, permitting the storage of heat to be accomplished by way of crystallization or fusion heat.

In order to attain this object by the said method, the invention provides that a heat-supplying primary carrier liquid is employed to convert a solid storage medium to the liquid state by supplying fusion heat thereto, and a secondary carrier liquid is employed for recovering heat on demand by causing said secondary liquid to flow in a desired amount through a per se known rotary crystallization drum immersed with a portion of its circumference in the liquid storage medium, so that said storage medium solidifies on the walls of said drum, whereupon the solidified storage medium is again carried into heat exchange relationship with the heat-supplying primary carrier liquid by the rotation of said drum.

According to the invention the problem of crystallization delay is solved by generating the nuclei or starting points for the crystallization by a continuous mechanical action. This mechanical generation of the starting points is accomplished by the rotation of the drum in the liquid storage medium, said drum being comparable in the widest sense with a so-called flaking machine or crystallization drum.

The method according to the invention offers the possibility to employ the fusion heat for storing heat energy on a commercial scale. The primary carrier liquid serves as supplier of heat for introducing heat into the system either continuously or at arbitrary intervals. The storage medium receives and stores the supplied heat. If there is then a demand of heat, the secondary carrier liquid is fed through the drum. The withdrawal of heat by the secondary carrier liquid causes the storage medium adjacent the walls of the crystallization drum to be cooled down. This results in the storage medium crystallizing on the crystallization drum and being subsequently carried in the solid state to an elevation above the level of the storage medium by the continuous rotation of the drum. The drum thus serves not only as a crystallization base, but also for conveying the solidified storage medium toward a location whereat it is to be brought into heat-exchange relationship with the heat-supplying primary carrier liquid. In most cases this location will be defined by a heat exchanger.

At this point the cycle starts anew, since the primary carrier liquid reconverts the conveyed amount of the solidified storage medium to its liquid state in accordance with the available heat supply, the liquefied storage medium being returned to the body of the liquid storage medium.

In order to attain the stated object by said apparatus, the invention provides that a heat-supplying primary carrier liquid is employed to convert a solid storage medium to the liquid state by supplying fusion heat thereto, and a secondary carrier liquid is employed for recovering heat on demand by causing said secondary liquid to flow in a desired amount through a per se known rotary crystallization drum immersed with a port of its circumference in the liquid storage medium, so that said storage medium solidifies on the walls of said drum, whereupon the solidified storage medium is again carried into heat exchange relationship with the primary carrier liquid by the rotation of said drum.

For the proper functioning of the method and apparatus according to the invention it is not essential that the primary carrier liquid be identical to the secondary liquid. Suitable storage media are any substances having their phase conversion point from the solid to the liquid state within the range of the desired storage temperature.

The heat exchanger may be, but does not have to be, located above the storage medium. Depending on the properties of the storage medium, the heat exchanger could for instance be immersed in the storage medium in the form of a coil heat exchanger.

In the apparatus according to the invention, the secondary carrier medium is supplied to the interior of the drum through an inlet, and is then heated within the drum. The heated secondary carrier liquid may then be pumped off or exhausted through an outlet. The introduction and exhaustion of the secondary carrier liquid to the interior of the drum and from the drum, respectively, may be carried out continuously or intermittently.

The drum is rotated during the heat exchange between the storage medium and the secondary carrier liquid. This enables a layer of solidified storage medium to form on the outer surface of the drum during its immersion in the liquefied storage medium. During rotation of the drum, this solidified layer is removed from the drum surface by means of a scraper assembly and conveyed to a portion of the reservoir space whereat the solidified storage medium may be reconverted to its liquid state by the available heat supply of the primary carrier liquid.

BRIEF DESCRIPTION OF THE DRAWINGS

A preferred embodiment of the invention shall now be described with reference to the accompanying drawings, wherein.

DETAILED DESCRIPTION

Figure 1:
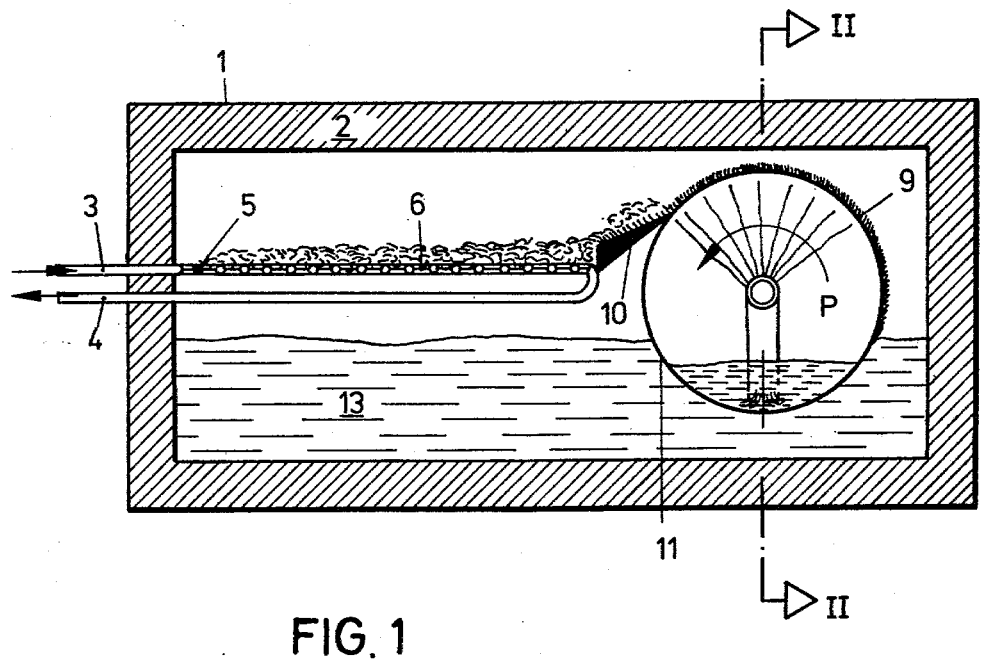
FIG. 1 shows a longitudinal sectional view of an apparatus for storing heat energy by means of a fusion heat storage arrangement.
Figure 2:
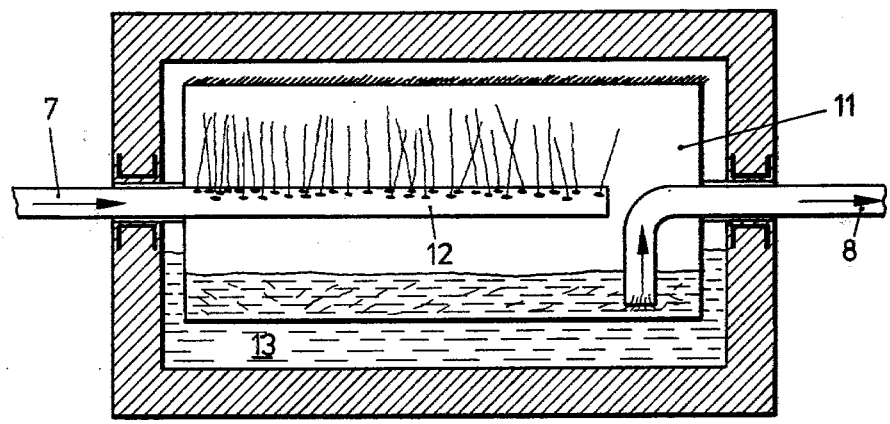
FIG. 2 shows a cross-sectional view of the apparatus shown in FIG. 1 along the line II—II.

The shown apparatus according to the invention comprises a closed reservoir 1 provided with an outer insulation layer 2. Supply and return ducts 3, 4 for a primary carrier liquid extend through the reservoir wall to communicate with a heat exchanger 5 provided with a grid. The primary carrier liquid conveys the heat to be stored into the reservoir, wherein this heat is employed to convert a solidified storage medium 6 on the heat exchanger grid to the liquid state. The storage medium is thus liquefied by heat exchange and stores the supplied heat in the form of fusion heat. During liquefication, the storage medium drops off the grid into the lower portion of the reservoir 1 wherein it is collected in the form of a liquid body 13.

Located within the reservoir is a crystallization drum 11 supported in the present case for rotation about a horizontal axis, so that a portion of its circumference is immersed in the liquid storage medium body 13. In an advanced embodiment of the invention, the mounting of the drum may not be stationary, but rather vertically adjustable with respect to the level of the liquid body 13.

An inlet 7 for a secondary carrier liquid extends through one stub axle of the crystallization drum, said inlet having a closed end 12 and a plurality of exit openings interiorly of the drum. An outlet duct 8 for the secondary carrier liquid extends through the other stub axle of the drum. The outlet duct 8 has a depending open end portion serving to withdraw the secondary from the interior of the drum as by means of a pump for conveying it to the heat consumer.

The secondary carrier liquid contained in the drum is heated at the drum wall by the heat surrendered by the storage medium. This causes the storage medium immediately adjacent the outer surface of the drum to cool so as to adhere to the drum in the form of a solidified crystal layer 9. The thickness of the crystal layer may be varied by varying the immersion depth and/or rotational speed of the drum. Rotation of the drum causes the crystallized layer 9 to be conveyed upwards in the direction of arrow P to a location above the liquid body. During rotation of the drum, the solidified layer adhering thereto is detached therefrom by means of a scraper arrangement 10 in the form of a downwardly inclined doctor blade in tangential contact with the drum, and returned to the grid of the heat exchanger 5. The so formed crystal flakes are collected on the heat exchanger grid in preparation for storing the heat supplied by the primary carrier liquid by liquefication, thus completing the cycle. In the embodiment of the invention shown, the heat exchanger 5 is located above the level of the liquid storage medium, so that the grid is at a higher elevation than the axis of rotation of the crystallization drum. The scraper arrangement forms a guide surface inclined downwards from the surface portion of the crystallization drum carrying the solidified storage medium towards the end of the grid adjacent the drum. It is also possible, however, to arrange the heat exchanger in a different manner. Depending on the properties of the storage medium, it could also be designed as a coil heat exchanger immersed in the storage medium. In this case the scraper arrangement would have to be modified so as to enable it to perform its function as a conveying means between the crystallization drum and the heat exchanger.

I claim:

1. A method for storing of heat, in which fusion heat is supplied to melt a solidified heat storage medium, and heat is removed as desired by flowing a heat-absorbing carrier liquid in the desired amount through a first heat transfer mechanism which is dipped into the melted storage medium and thereby permitting the storage medium to solidify on the walls of the first heat transfer mechanism, wherein the improvement comprises:
   supplying the fusion heat by heat transfer from a primary, heat-emitting carrier liquid to the solidified storage medium;
   using as said first heat transfer mechanism a conventional rotating crystallization drum and partially immersing the circumferential wall of said rotating drum into the melted storage medium; and
   rotating the drum, and thereby transporting the storage medium which has solidified on the walls of the drum into heat transfer relation with said primary, heat-emitting carrier liquid.

2. Apparatus for storing of heat, comprising:
   a container for receiving a storage medium and a first heat transfer mechanism submerged into the storage medium in said container, said first heat transfer mechanism having an infeed and a discharge for a heat-absorbing carrier liquid, wherein the improvement comprises:
   a crystallization drum which forms said first heat transfer mechanism, said drum being supported and drivable rotatably about its axis in said container and being partially submerged in said storage medium, said infeed and discharge for said heat-absorbing carrier liquid ending inside of said crystallization drum; and
   a second heat transfer mechanism and primary heat-emitting carrier liquid infeed and discharge lines which lead to said second heat transfer mechanism, said second heat transfer mechanism being located in said container adjacent said drum to receive therefrom the solidified storage medium picked up and transported by said drum during its rotation.

3. An apparatus according to claim 2, including a scraping means interposed between said crystallization drum and said second heat transfer mechanism and engaging said drum for transferring the storage medium previously picked up on the crystallization drum onto said second heat transfer mechanism.

4. An apparatus according to one of claims 2 and 3, wherein said second heat transfer mechanism is located above the liquid level of said storage medium in said container.

5. An apparatus according to one of claims 2 and 3, wherein said second heat transfer mechanism is completely submerged in said storage medium in said container.

6. An apparatus according to one of claims 2 and 3, wherein said infeed of said heat-absorbing carrier liquid has within said crystallization drum an end area provided with a plurality of holes and closed at the end thereof, said discharge for said heat-absorbing carrier liquid having a scoop end which dips into the heat-absorbing carrier liquid in said crystallization drum.

7. An apparatus for storing of heat, comprising a reservoir for containing a storage medium, a driven crystallization drum supported within said reservoir for rotation about its axis of rotation, said drum being partially immersed in said storage medium, an inlet opening into the interior of said crystallization drum and an outlet out of said drum for a secondary carrier liquid employed for recovering heat, and supply and return ducts for a primary carrier liquid communicating with a heat exchanger located within said reservoir and being of suitable configuration for receiving the solidified storage medium supplied thereto by rotation of said drum, said heat exchanger being located above the level of said liquid storage medium.

8. An apparatus for storing of heat, in which fusion heat is supplied to melt a solidified storage medium, comprising:

a container containing said heat storage medium;

a crystallization drum which forms a first heat exchanger, said drum being supported rotatably about its axis in said container and having its circumferential wall partially submerged in said storage medium, and an infeed and a discharge ending inside of said crystallization drum for transporting a heat-absorbing carrier liquid through said drum to extract the heat of fusion from storage medium in contact with said drum; and said rotating drum providing on its circumferential wall a surface for supporting and transporting through a fixed orbit cooled, and thus solidified, portions of said storage medium;

a second heat exchanger and primary heat-emitting carrier liquid infeed and discharge lines which lead to said second heat exchanger, said second heat exchanger being located adjacent said drum to receive therefrom the solidified storage medium picked up and transported by said drum during its rotation, said second heat exchanger being located above the liquid level of said storage medium in said container for melting thereon and dropping back into the body of melted heat storage medium in said container of said solidified storage medium from said drum;

a scraping member inclined from and edge bearing on said rotating drum and said second heat exchanger for scraping storage medium off the orbiting circumferential wall of said rotating drum and depositing same by gravity onto said second heat exchanger.

* * * * *